US010678336B2

(12) United States Patent
DeMena, III (10) Patent No.: US 10,678,336 B2
(45) Date of Patent: Jun. 9, 2020

(54) ORIENT A USER INTERFACE TO A SIDE (71) Applicant: HEWLETT-PACKARD DEVELOPMENT COMPANY, L.P., Houston, TX (US)

(72) Inventor: Ronald Andrew DeMena, III, Batavia, NY (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 14/906,652

(22) PCT Filed: Sep. 10, 2013

(86) PCT No.: PCT/US2013/059050
§ 371 (c)(1),
(2) Date: Jan. 21, 2016

(87) PCT Pub. No.: WO2015/038101
PCT Pub. Date: Mar. 19, 2015

(65) Prior Publication Data
US 2016/0179207 A1 Jun. 23, 2016

(51) Int. Cl.
*G06F 3/048* (2013.01)
*G06F 3/01* (2006.01)
*G06F 3/0488* (2013.01)
*G06F 3/0346* (2013.01)
*G06F 3/0481* (2013.01)
(Continued)

(52) U.S. Cl.
CPC ............ *G06F 3/017* (2013.01); *G06F 3/0346* (2013.01); *G06F 3/0488* (2013.01); *G06F 3/04817* (2013.01); *G06F 3/04883* (2013.01); *G06F 3/04886* (2013.01); *G06T 3/60* (2013.01); *G09G 5/00* (2013.01); *G06F 3/04842* (2013.01); *G06F 2200/1614* (2013.01);
(Continued)

(58) Field of Classification Search
CPC .... G06F 3/04883; G06F 3/017; G06F 3/0488; G06F 3/0481; G06F 3/0482; G06F 2203/04808; G06F 3/04886; G06F 3/04842; G06F 3/0485; G06F 3/04845; G06F 2203/04806; G06F 3/04817; H04M 2250/22; G06T 3/60; G06T 2200/24; G09G 2340/0492; G09G 2340/14; G09G 5/00
See application file for complete search history.

(56) References Cited

U.S. PATENT DOCUMENTS 6,597,384 B1 7/2003 Harrison
2003/0085870 A1\* 5/2003 Hinckley .............. G06F 1/1626
345/156

(Continued)

FOREIGN PATENT DOCUMENTS

CN 103226396 7/2013
JP 2011248573 12/2011
JP 2013507696 3/2013

OTHER PUBLICATIONS

"IOS 5 Tips: Use Assistive Touch to Replace a Broken Home Button, Lock Button or Volume Button"; Dec. 26, 2011; 12 pages.

*Primary Examiner* — Tuyetlien T Tran
(74) *Attorney, Agent, or Firm* — HPI Patent Department (57) ABSTRACT

A display and an input member. A controller to generate a user interface on the display and orient the displayed user interface to a side of the display in response to an activation of the input member.

14 Claims, 7 Drawing Sheets

(51) Int. Cl.
  *G06T 3/60* (2006.01)
  *G09G 5/00* (2006.01)
  *G06F 3/0484* (2013.01)

(52) U.S. Cl.
  CPC ............... *G06F 2203/04808* (2013.01); *G06T 2200/24* (2013.01); *G09G 2340/0492* (2013.01); *G09G 2340/14* (2013.01)

(56) References Cited

U.S. PATENT DOCUMENTS

| | | | | |
|---|---|---|---|---|
| 2005/0140696 | A1* | 6/2005 | Buxton | G06F 3/04845 345/660 |
| 2006/0274046 | A1* | 12/2006 | Hillis | G06F 3/04883 345/173 |
| 2007/0157095 | A1* | 7/2007 | Bilow | G06F 3/0481 715/744 |
| 2007/0158442 | A1* | 7/2007 | Chapman, Jr. | F24D 19/10 236/1 C |
| 2007/0220444 | A1* | 9/2007 | Sunday | G06F 3/0488 715/788 |
| 2009/0201257 | A1* | 8/2009 | Saitoh | G06F 1/162 345/173 |
| 2010/0066667 | A1* | 3/2010 | MacDougall | G06K 9/00228 345/156 |
| 2010/0194703 | A1 | 8/2010 | Fedor et al. | |
| 2012/0052933 | A1 | 3/2012 | Olson et al. | |
| 2012/0054641 | A1* | 3/2012 | Sae-Chim | G06F 3/0489 715/752 |
| 2012/0081845 | A1* | 4/2012 | Yato | G06F 1/1616 361/679.01 |
| 2012/0127069 | A1* | 5/2012 | Santhiveeran | G06F 1/1686 345/156 |
| 2012/0236033 | A1* | 9/2012 | Rud | G05B 19/042 345/649 |
| 2012/0314354 | A1 | 12/2012 | Rayner | |
| 2013/0002565 | A1 | 1/2013 | Tumanov et al. | |
| 2013/0038634 | A1* | 2/2013 | Yamada | G09G 5/00 345/649 |
| 2013/0083074 | A1 | 4/2013 | Nurmi et al. | |
| 2013/0194176 | A1 | 8/2013 | Chung | |
| 2015/0058762 | A1* | 2/2015 | Sato | G06F 3/04845 715/763 |

* cited by examiner

ORIENT A USER INTERFACE TO A SIDE

BACKGROUND

A tablet computer is a one-piece mobile computer. A tablet may have a touchscreen to enable interaction with a finger or stylus. A user may hold a tablet in front of them to read the content displayed on the touchscreen. A rectangular touchscreen can be rotated between portrait and landscape. A sensor can determine if the touchscreen is in portrait or landscape.

BRIEF DESCRIPTION OF THE DRAWINGS

Some examples of the invention are described with respect to the following figures.

DETAILED DESCRIPTION

A user of a tablet may hold the tablet in front of them so that one side of the display is lower than another side of the display. A tablet may have a display that recognizes touch input such as a touchscreen. For example the orientation sensor may be able to determine if the display is in a landscape or portrait orientation and a controller can rotate the user interface so that the bottom of the user interface (UI) is at the lowest side of the display and the text and graphics in the UI are upright to the user. When the tablet is on a desk, table or otherwise near horizontal all of the sides of the tablet are at substantially equal height and a controller cannot rotate a UI to a lowest side as none of the sides are lower than another. As described in the examples herein, a user can orient the user interface independent of the orientation sensor by using input members that indicate the different sides of the display. The input members may be for example a physical or virtual: button, switch, icon or another input member.

In one example, a computing device can include a display, a plurality of input members and a controller. A controller may generate a user interface on the display and orient the displayed user interface to a side of the display in response to an activation of one, of the plurality of input members.

An example of a method may determine by an orientation sensor if a display of a computing device is in a substantially horizontal plane. When the display is in a substantially horizontal plane orient a user interface displayed on the display to a side of a display different than the current orientation when an input member is activated.

In another example, a non-transitory computer readable medium can include code that if executed by a controller in a computing device can cause the controller to orient a user interface to a first side when a first input member is activated, a second side when a second input member is activated, a third side when a third input member is activated or a fourth side when the fourth input member is activated. The code can cause the controller to assign another function to the other input member when then user interface is oriented to one side.

Figure 1:
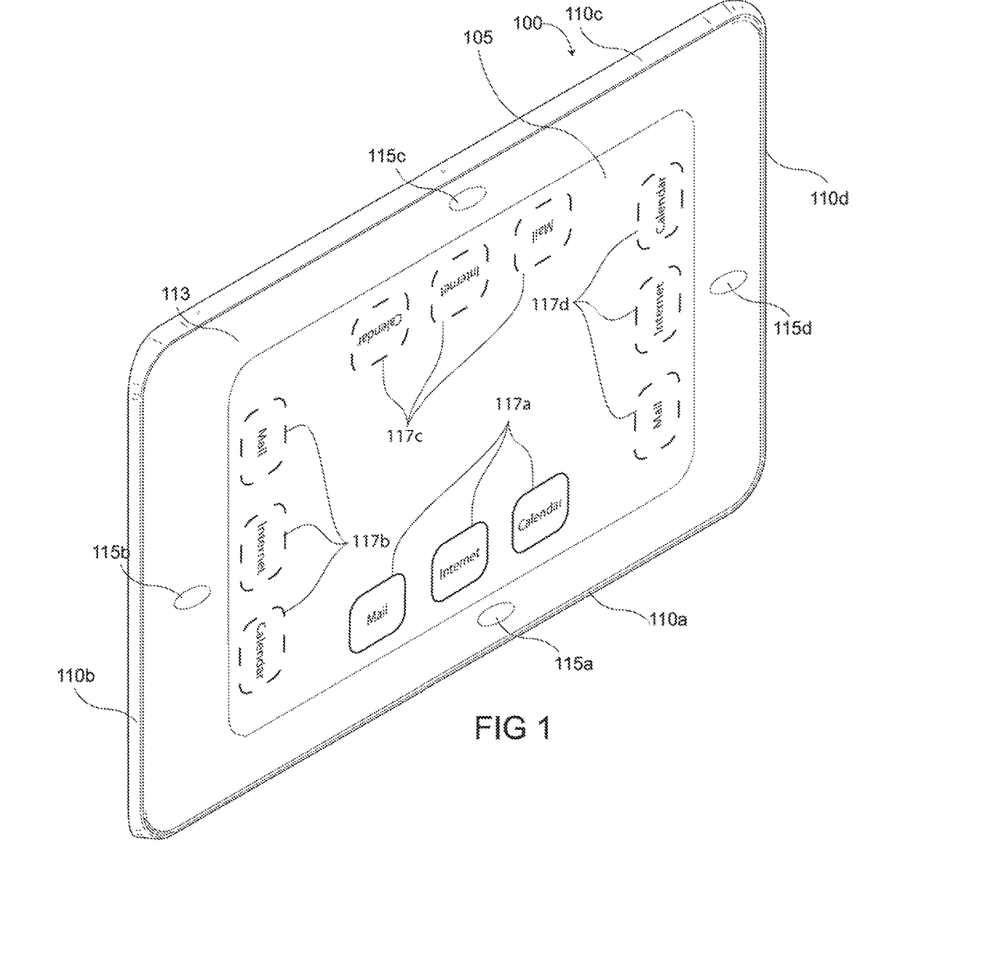
FIG. 1 is a computing device according to an example implementation.

With reference to the figures, FIG. 1 is a computing device according to an example implementation. The computing, device can be for example a tablet computing device. The computing device can include a display 105. The computing device 100 can include plurality of input members 115*a-d* to orient a displayed user interface 117 to a side 110*a-d* of the display in response to an activation of one of the plurality of input members 115*a-d*. The user interface 117 is shown is different orientations such as 117*a-d*. User interface 117*b-d* are shown in dotted lines to indicate that it is user interface 117*a* oriented to a different side. A first input member 115*a* can be associated with a first side 110*a* of the display 105, a second input member 115*b* can be associated with a second side 110*b* of the display 105, a third input member 105*c* can be associated with a third side 110*c* of the display 105 and a fourth input member 115*d* can be associated with a fourth side 110*d* of the display. The computing device 100 can include a controller to orient a user interface 117*a* to the first side 110*a* when the first input member 115*a* is activated, the user interface 117*b* to the second side when the second input member 115*b* is activated, the user interface 117*c* to the third side when the third input member 115*c* is activated, and the user interface 117*d* to the fourth side when the fourth input member 115*d* is activated.

The display may be a liquid crystal display (LCD), organic light emitting diode (OLED) or another display technology. The touches can be detected by resistive, capacitive or another touch detection technology. The first input member, second input member, third input member and fourth input member, can be physical push input members that when pressed and released return to their original state. The input members 115*a-d* may be capacitive input members that are activated by a change in capacitance, virtual input members on the display or another type of input member. In one example the input members 115*a-d* are on the bezel 113 of the computing device, the bezel 113 is around the display between the side of the computing device and the edge of the display.

The controller (not illustrated in FIG. 1) may be a general purpose processor such as a reduced instruction set processor (RISC), an application specific integrated circuit (ASIC), or another type of controller. The controller can control how images are displayed on the display 105. For example a UI can include text and graphics. The text and graphics have a top and a bottom and should be rotated so for example the user can read the text or view the graphics in the correct orientation of the text or graphics. For example when a tablet is substantially horizontal such as on a table and one side of the tablet is closer to the user than another side and the top of the UI should be adjacent to the side further from the user while the bottom of the user interface should be adjacent the side closest to the user such orientation of the user interface may not be decided using sensors.

When the user activates the first input member 115*a*, second input member 115*b*, third input member 115*c*, or fourth input member 115*d* the controller can rotate the UI so that one side of the UI such as the bottom of the UI is adjacent to the side of the display 105 that corresponds to the input member activated. For example if the user presses the first input member 115*a* the controller rotates the UI so that the bottom of the UI is adjacent the first side 110*a*.

Figure 2:
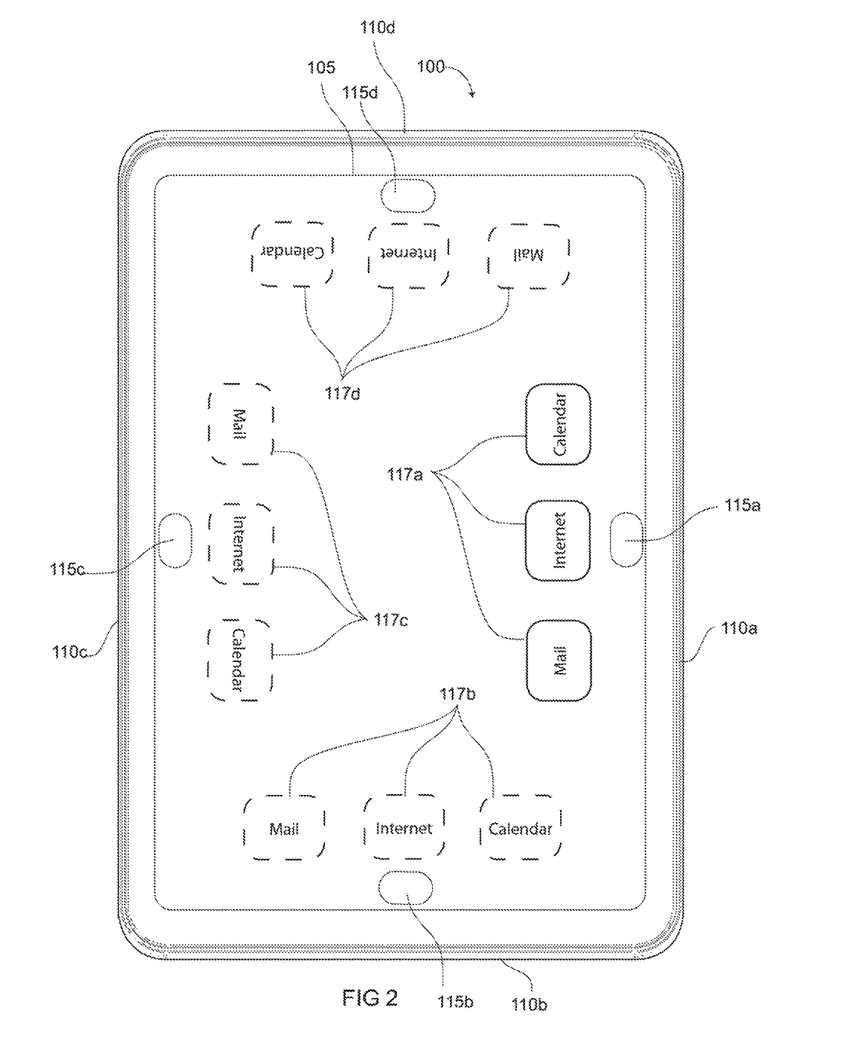
FIG. 2 is a computing device according to an example implementation.

FIG. 2 is a computing device according to an example implementation. The first input member 115a, second input member 115b, third input member 115c and fourth input member 115d may be virtual input members such as icons displayed on the display 105. An icon can be a pictogram displayed on a computer screen in order to help user navigate a computer system. The icon may be various shapes and sizes and may include text in the icon or may have a text description below the icon. In the example where the input members are virtual on a display they may be caused to appear on the display at different time determined by the controller such as when the orientation of the system is substantially horizontal. The controller can also cause the virtual input members to not be displayed during other conditions. In one example a gesture has to be received by the system to activate the input member, for example the input member may be dragged to a side of the display to indicate to the computing device to orient the user interface 117a-d to that side.

Figure 3:
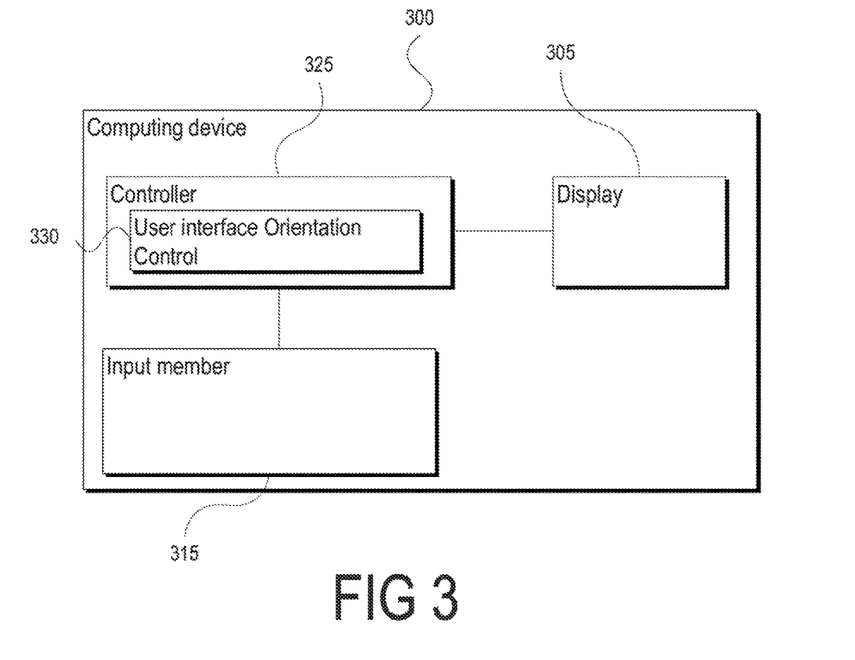
FIG. 3 is block diagram of a computing device according to an example implementation.

FIG. 3 is a block diagram of a computing device according to an example implementation. The computing device can be for example a tablet computing device. The computing device can include a display 305 and an input member 315. The input member may be physical or virtual such as icons on the display. The computing device 300 can include a controller 325 with a user interface orientation control 330. The user interface orientation control can receive a signal generated by the input member 315 and cause the user interface to change orientations.

Figure 4:
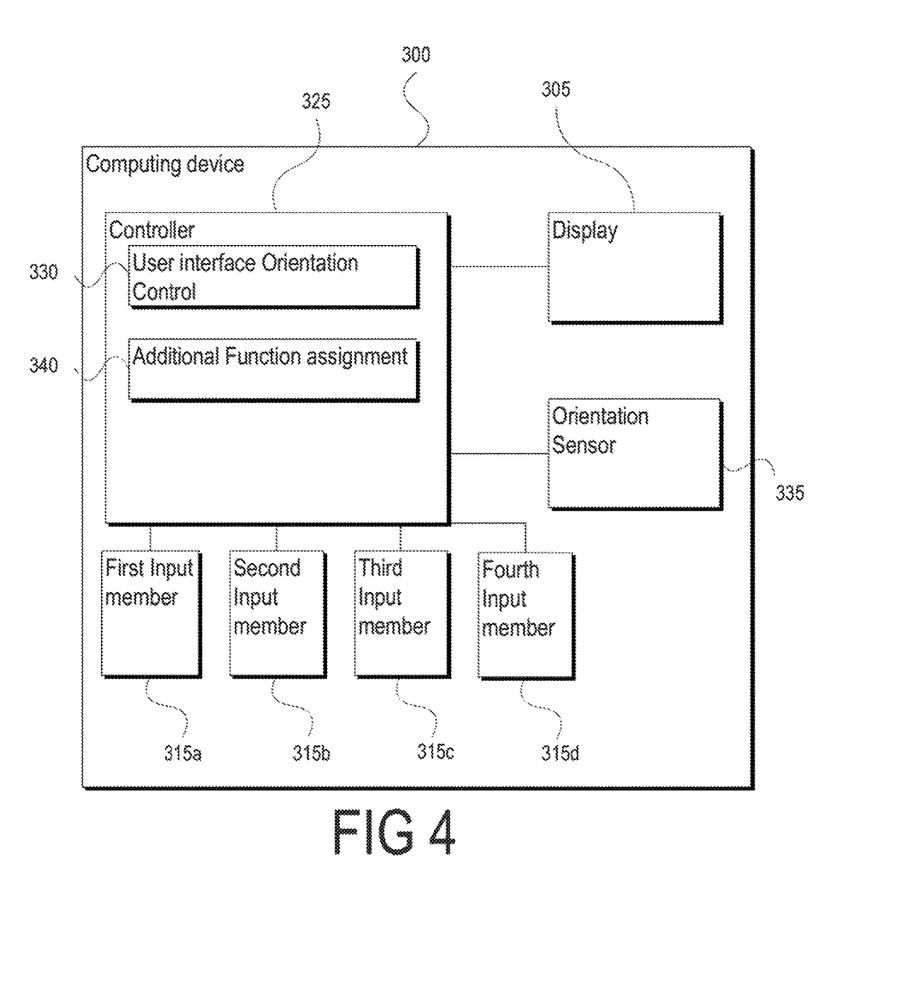
FIG. 4 is a block diagram of computing device according to an example implementation.

FIG. 4 is a block diagram of a computing device 300 according to an example implementation. The computing device 300 can include an orientation sensor 335. The orientation sensor 335 may be for example an accelerometer, a gyroscope or another type of orientation sensor. The orientation sensor 335 may determine the position of each side of the display 305, based on movement or other information to establish the orientation of the computing device 300.

The orientation sensor 335 can determine when the display 305 is substantially horizontal The display 305 may be horizontal if the sides of the display 305 are perpendicular to the force of the gravity. When the display is substantially horizontal, such as for example within a 5 degree threshold, the location that the user is viewing the display 305 from cannot be assumed, as the computing device 300 assumes the user interface should be parallel to the force of gravity. The user interface can be oriented to a first side when one of the plurality of input members 315a-d is activated and when the orientation sensor 335 indicates the display 305 is substantially horizontal.

After an input member is used to indicate the orientation of the display 305 to one of the sides that input member may become the home input member for the user interface. The home input member may take a user back to the home screen of the user interface. The controller may associate an additional function to another input member of the plurality of input members when the user interface is oriented to the first side. For example a second input member that can be used to orient a user interface to another side can have the function changed to something other than screen orientation such as volume control, power control such as sleep or display 305 off or another function. When an input member's function is changed the input member may still function to reorient the display 305 to the side associated with that input member by assigning multiple functions to an input member. The multiple functions can be assigned by using single press and release, double press and release, triple press and release press and hold or another type of input member activation.

The controller can distinguish between another input member activation for an additional function such as a double tap and release and to orient the user interface to another side by a single tap and release, although other combinations are contemplated.

When a computing device is not in a substantially horizontal position the controller may orient the user interface to one of the sides of the touch display 305 based on the orientation sensor. For example when the sides of the computing device are outside of a threshold relative to being perpendicular to gravity the controller may orient the bottom of the user interface to the lowest side of the computing device.

The input member 315 may be for example a first input member 315a to orient the user interface to a first side, a second input member 315b to orient the user interface to a second side, a third input member 315c to orient the user interface to a third side and a fourth input member 315d to orient the user interface to a fourth side.

Figure 5:
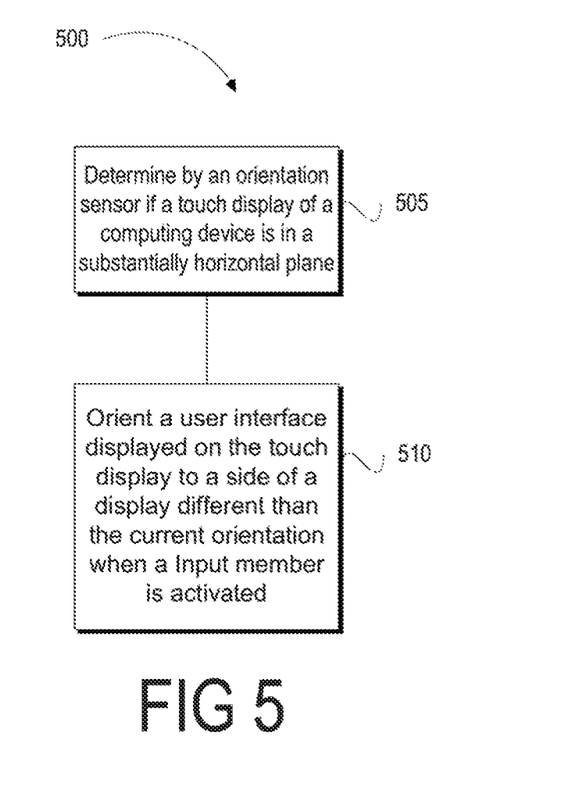
FIG. 5 is a flow diagram of a method of orienting user interface according to an example implementation.

FIG. 5 is a flow diagram of a method of orienting a user interface according to example implementation. The method 500 includes determining by an orientation sensor 335 if a display of a computing device is in a substantially horizontal plane at 505. A user interface can be displayed on the display 305 and oriented to a side of a display different than the current orientation when an input member 316 is activated at 510. The method 500 may be practiced with any of the examples shown in FIGS. 1 to 4.

Figure 6:
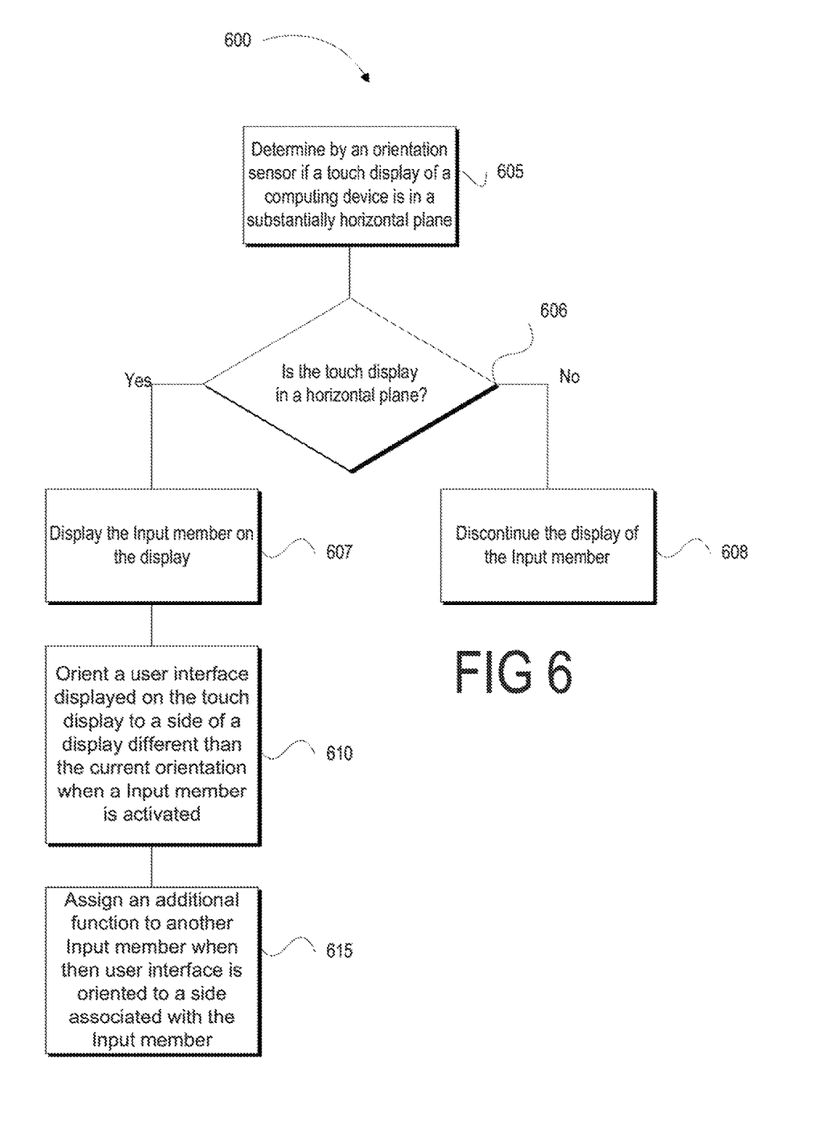
FIG. 6 is a flow diagram of a method of orienting a user interface according to an example implementation.

FIG. 6 is a flow diagram of a method of orienting a user interface according to an example implementation. The method 600 may be practiced with any of the examples shown in FIGS. 1 to 4. The method 600 includes determining by an orientation sensor 335 if a display of a computing device is in a substantially horizontal plane at 605. At 606 a decision is made based on the determination in 605. The input member may be an icon displayed on the display. If the display is not in a substantially horizontal plane the display of the input member is on the display is discontinued at 608.

If the display is in a substantially horizontal plane the input member is displayed on the display at 607. A user interface can be displayed on the display 305 and oriented to a side of a display different than the current orientation when an input member 315 is activated at 610. The input member may for example rotate the user interface on the display 90 degrees for each press of the input member.

An additional function can be assigned to another input member when the user interface is oriented to a side associated with the input member at 615. For example a second input member may orient the user interface to another side different than the side of the display that the input member oriented the user interface to. The second input member may also have another function when the input member orients the user interface to a side not associated with the second input member.

Figure 7:
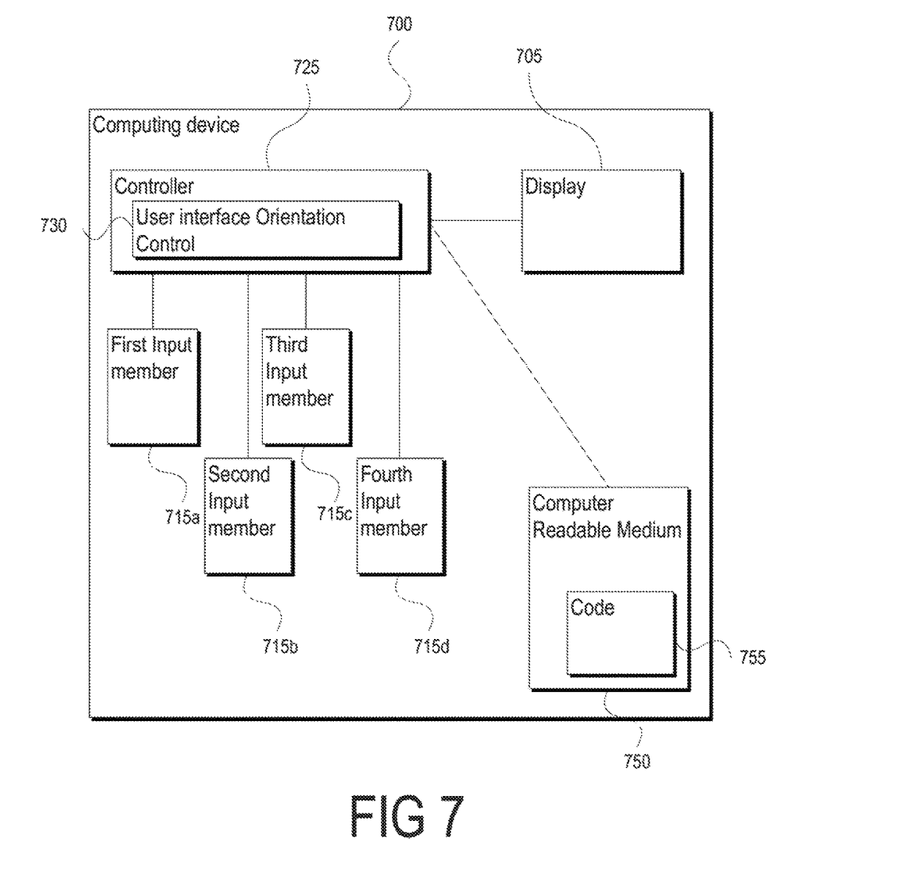
FIG. 7 is a computing system including a computer readable medium according to an example implementation.

FIG. 7 is a computing system including a computer readable medium according to an example implementation. The computing device 700 can include a non-transitory computer readable medium 750 comprising code 755 that if executed by a controller 725 in the computing device 700 causes the controller to orient a user interface to a first side when a first input member is activated, a second side when a second input member is activated, a third side when a third input member is activated and a fourth side when a fourth input member is activated. The code can also cause the controller to assign another function to the second input member when then user interface is oriented to the first side. The code may also cause the controller to determine by an orientation sensor if a display of a computing device is in a substantially horizontal plane.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

It is to be understood that the phraseology and terminology used herein is for the purpose of description and should not be regarded as limiting. The use of "comprising", "including" or "having" are synonymous and variations thereof herein is meant to encompass the items listed thereafter and equivalents thereof as well as additional items. It should also be noted that a plurality of hardware and software based devices, as well as a plurality of different structural components may be used to implement the disclosed methods and systems.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
   a display to display a user interface;
   a first input member to initiate a first function including orienting a user interface to a first side of the display responsive to an activation of the first input member;
   a second input member to initiate a second function including orienting the user interface to a second side of the display responsive to an activation of the second input member;
   a controller including instructions executable to:
      generate the user interface and orient the user interface to the first side responsive to the activation of the first input member; and
      assign, responsive to the user interface being oriented to the first side responsive to the first function being initiated by the activation of the first input member, an additional third function initiated by activation of the first input member, and an additional fourth function initiated by activation of the second input member,
   wherein the third additional function includes a function other than orienting the user interface to the first side of the display,
   wherein the first function is changed to be initiated by a different type of activation of the first input member, and the second function is changed to be initiated by a different type of activation of the second input member;
   wherein the controller is to orient the user interface independent of whether the computing device is being kept in a planar position; and
   wherein the controller is to orient the user interface from the first side of the display to the second side of the display when the second function is initiated by the different type of activation of the second input member.

2. The device of claim 1, wherein the first input member and the second input member are icons displayed on the display.

3. The device of claim 1, further comprising a bezel including the first input member and the second input member, wherein the bezel is around the display.

4. The device of claim 1, further comprising an orientation sensor.

5. The device of claim 4, wherein the controller includes instructions executable to generate a virtual first input member and a virtual second input member on the display when the orientation sensor indicates the display is substantially horizontal.

6. The device of claim 5, wherein the third additional function includes operating as a return to home screen command.

7. The device of claim 4, wherein the controller includes instructions executable to determine whether to initiate the second function or the fourth additional function based on a type of the activation of the second input member.

8. The device of claim 4, wherein the controller includes instructions executable to orient the user interface to one of the sides of the display based on the orientation sensor when the display is not in a substantially horizontal position.

9. The device of claim 1, wherein the computing device comprises, a third input member to orient the user interface to a third side and a fourth input member to orient the user interface to a fourth side.

10. A method comprising:
    determining by an orientation sensor when a display of a computing device is in a substantially horizontal plane;
    displaying a plurality of input members on the computing device responsive to determining that the display is in the substantially horizontal plane;
    performing, by a controller of the computing device, a first function including orienting a user interface displayed on the display to a first side of the display different than an initial side when a first input member of the plurality of input members receives a first type of activation, wherein performing the first function is independent of whether the computing device is kept in a substantially horizontal plane;
    performing, by the controller of the computing device, a second function when the first input member receives a second, different second type of activation, wherein the user interface remains oriented to the initial side when the second function is performed;
    assigning the different second type of activation of the first input member to initiate the first function, responsive to the user interface being oriented to a second side of the display different than the initial side responsive to a third function being initiated by an activation of a second input member.

11. The method of claim 10, including assigning the first type of activation of the first input to initiate the second function, responsive to the user interface being oriented to a second side of the display different than the initial side responsive to a third function being initiated by an activation of a second input member.

12. The method of claim 10, further comprising discontinuing the display of the input member when the display is not in a horizontal plane.

13. A non-transitory computer readable medium comprising instructions executable by a processor to cause the processor to:

perform a first function to orient a user interface of a computing device to a first side of a display of the computing device when a first input member of the computing device is activated, perform a second function to orient the user interface to a second side of the display of the computing device when a second input member of the computing device is activated by a first activation type, perform a third function to orient the user interface to a third side of the display of the computing device when a third input member of the computing device is activated, and perform a fourth function to orient the user interface to a fourth side of the display of the computing device when a fourth input member of the computing device is activated;

assign an additional fifth function and an additional sixth function to the second input member of the computing device when the user interface is oriented to the first side of the display of the computing device, wherein the fifth additional includes a function other than orienting the user interface to the second side of the display;

perform the second function to orient the user interface of the computing device to the second side when the second input member of the computing device is activated by a second activation type when the user interface is oriented to the first side of the display of the computing device;

reorient the user interface independent of wherein the computing device is being kept in a planar position; and wherein the first input member, the second input member, the third input member, and the fourth input member are physical button input members.

14. The computer readable medium of claim 13 further comprising the instructions executable to determine by an orientation sensor if the display of the computing device is in a substantially horizontal plane.

* * * * *